United States Patent [19]

Meyers

[11] Patent Number: 4,790,079

[45] Date of Patent: Dec. 13, 1988

[54] UNIVERSAL JOINT ALIGNMENT CHECKING TOOL

[75] Inventor: Richard P. Meyers, Toledo, Ohio

[73] Assignee: Dana Corporation, Toledo, Ohio

[21] Appl. No.: 125,493

[22] Filed: Nov. 25, 1987

Related U.S. Application Data

[63] Continuation-in-part of Ser. No. 8,890, Jan. 30, 1987, abandoned.

[51] Int. Cl.⁴ .............................................. G01B 5/08
[52] U.S. Cl. ........................................ 33/517; 33/533; 33/542; 33/600; 33/645
[58] Field of Search .................. 33/517, 533, 542, 600, 33/645

[56] References Cited

U.S. PATENT DOCUMENTS

| | | | |
|---|---|---|---|
| 1,186,975 | 6/1916 | Bryant | 33/178 B |
| 1,217,313 | 2/1917 | Johnasson | 33/178 B |
| 1,612,386 | 12/1926 | McAtee | 33/517 X |
| 2,517,268 | 8/1950 | Wilson | 33/517 X |
| 2,573,531 | 10/1951 | Arp | 33/517 X |
| 2,616,184 | 11/1952 | Mendro et al. | 33/181 AT |
| 3,114,207 | 12/1963 | Eisele | 33/517 X |
| 4,338,726 | 7/1982 | Swailes | 33/543 |

OTHER PUBLICATIONS

Dana Corporation, Bulletin No. 3236, Printed Nov. 1985, entitled "Spicer U-Joint Component Crosshole Alignment and Wear Gauges".

Dana Corporation, Bulletin No. 3249, Printed Dec. 1985, entitled "Spicer Universal Joint Division Drivelines and Components".

Dana Corporation, Bulletin No. 3247/DSD, printed Jul. 1987, "Half Round End Yokes—Vehicular Mobile Off Highway".

Primary Examiner—William D. Martin, Jr.
Attorney, Agent, or Firm—Irvin L. Groh; Alfred L. Patmore, Jr.

[57] ABSTRACT

A gaging tool for checking the alignment of spaced apart holes located on a common axis, having particular utility for checking the alignment of bearing seats on half round yokes for universal joints. A pair of gage bushings are secured in the bearing seats by retaining straps. An alignment bar is passed through the internal gage bore of one of the bushings. When the bearing seats or holes are in alignment, the alignment bar will pass into the other of the pair of gage bushings.

6 Claims, 2 Drawing Sheets

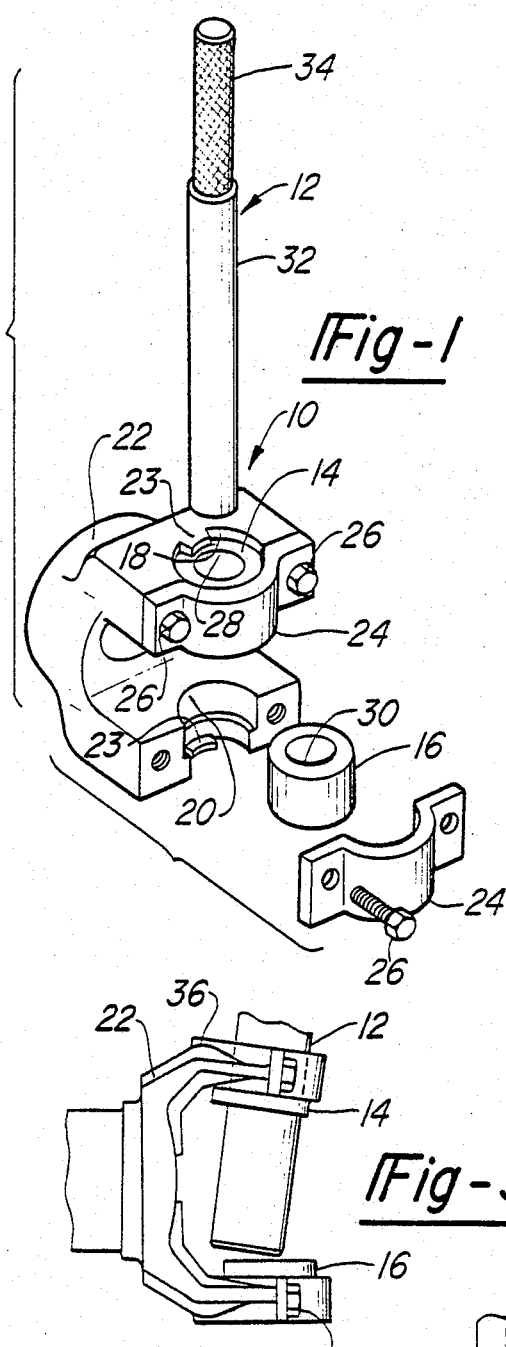
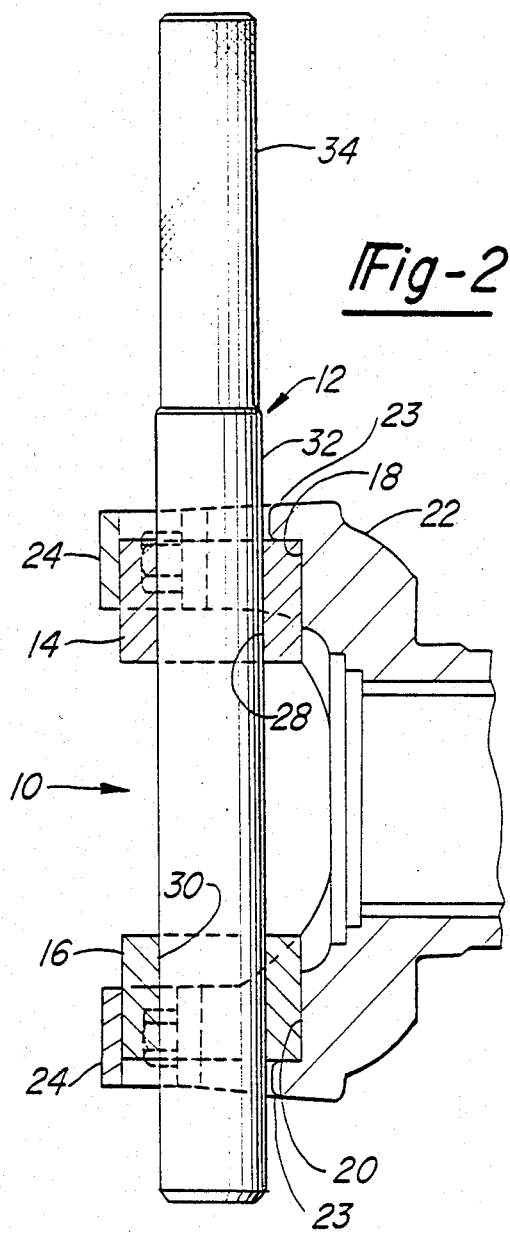
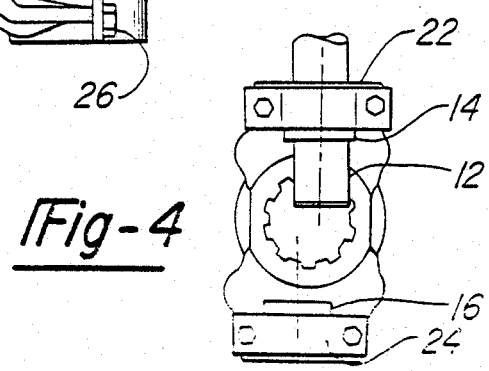
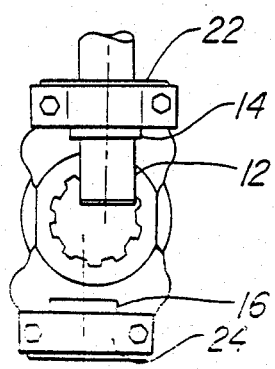

UNIVERSAL JOINT ALIGNMENT CHECKING TOOL

This application is a continuation-in-part of Ser. No. 008,980 filed Jan. 30, 1987, now abandoned.

BACKGROUND OF THE INVENTION

1. Field of the Invention:

This invention relates to a gaging tool and the method of using the tool, and, more particularly to a gaging tool for checking the alignment of two spaced apart holes located on a common axis. The tool has a special utility for checking the alignment of bearing seats on half round yokes for universal joints.

2. Description of the Prior Art:

There are a wide variety of what are usually termed plug gages for determining the dimensional accuracy, usually a diameter, of holes. These are usually supplied in sets to provide a type of go/no-go gaging in which a plug gage of one size passes within or through the hole, and a plug gage of a slightly larger size does not pass into the hole. Thus the dimension of the hole can be established as lying between the diameters of the two plug gages.

When it comes to measuring the alignment accuracy of two spaced apart holes, the simple plug gage will not suffice. The usual procedure for checking the alignment of spaced holes involves the use of jigs and a feeler gage which must be elaboratley set up for checking each individual pair of spaced holes. Such a procedure is not practical and often impossible to perform in the field checking of the alignment of half round yoke cross holes for a universal joint.

Gaging tools recently developed by the Spicer Division of Dana Corporation permits checking the alignment of cross holes in U-joint components such as the full round end yokes, slip yokes and flange yokes used with universal joints. This alignment gage tool consists of a single alignment bar having an accurately ground surface for checking the alignment of spaced full round bearing holes. This gaging tool and its use is described in four page Bulletin No. 3236 printed by Dana Corporation, Toledo, Ohio entitled "Spicer ® U-joint Component Crosshole Alignment and Wear Gauges". This tool, however, does not provide a means for checking the alignment of half round bearing seats of a universal joint half round yoke.

As discussed in the aformentioned bulletin, one of the hardest working moving parts in a truck is the universal joint. Becuase of the extreme wear to which this U-joint is subjected, it must be replaced periodically. This is accomplished by the use of a kit which has a new universal joint with a first pair of aligned cross hole bearings for attachment to the drive shaft end yoke and a second pair of aligned bearings for attachment to the axle or the transmission yoke. Heretofore, both yoke connections had full round bearings seats, and the worn U-joint was removed by unbolting the closed end bearing cups from the yokes. A universal joint and a full round bearing seat yoke is shown in the upper picture on page 5 of 10 page Bulletin No. 3249 printed by Dana Corporation entitled "Spicer Universal Joint Division Drivelines and Components". If the yoke cross holes are misaligned, a new U-joint kit is likely to fail prematurely. The aformentioned new gaging tool allowed checking for misalignment in a full round bearing seat yoke. If there is misalignment the yoke must be replaced before installation of the U-joint kit.

A major improvement allowing faster U-joint replacement has been achieved by the introduction of half round end yokes where the cross holes are defined by half round bearing seats. Such a yoke is shown in the lower left hand photograph on page 8 of the aforementioned Bulletin no. 3249. However, the alignment of this type of yoke cannot be checked with the aforementioned gage. The end bearing cap retention lugs prevent passing the alignment tool into contact with both half round bearings seats, and even if there were no retention lugs, there is no way of sensing that the gage is in alignment. The bearing retention straps are not machined to act as the "other half" of the bearing seat to create a full round hole. The alignment of newly installed bearings cannot be checked at the closed end cap of the bearing does not allow sliding of the tool through one bearing into the other.

A SUMMARY OF THE INVENTION

A gaging tool for checking the alignment of two spaced apart half round bearings seats located on a common axis of a connection yoke includes a pair of gage bushings each having an outside diameter corresponding to the diameter of the half round bearings seats whose alignment is to be checked. Each of the pair of gage bushings has a uniform internal gage bore. The tool also includes a cylindrical alignment bar having an external diameter adapted to be closely received thourgh the internal gage bore in each of the pair of gage bushings. The gage bushings are secured in the bearings seats to be checked. Passage of the alignment bar through one of the gage bushings and into the other gage bushing indicates alignment of the spaced holes. The inability to move the alignment bar into the other gage bushing indicates misalignment.

Typically the gaging tool has more than one pair of gage bushings with different external diameters for checking the alignment of half round bearings seats of different sizes. Each of the pairs of gage bushings has the same uniform internal gage diameter closely receiving the cylindrical alignment bar.

The method of checking the alignment of two spaced apart holes located on a common axis, where the holes are partially defined by the bearings seats on a half round end yoke includes the following steps:

(a) selecting a pair of gage bushings which have the sme uniform internal bore and an external cylindrical diameter conforming to the bearing seat diameter;

(b) securing one of the gage bushings in each of the spaced apart bearing seats by attaching a pair of retaining straps to the yoke so that the spaced apart holes are defined by the gage bushings retained on the bearings seats;

(c) providing an alignment bar adapted to be closely received in the internal bore of the gage bushings;

(d) passing the alignment bar through the internal bore of one of the gage bushings; and (e) determining if the alignment bar will also pass into the internal bore of the other of the gage bushings.

The alignment bar is passed into the other or second gage bushing by a combination of a rotary and axial movement of the bar in a sliding engagement.

DRAWING

The preferred embodiments of the invention are illustrated in the drawing in which:

FIG. 1 is a perspective, partially exploded view showing the tool of this invention as it is employed to check the alignment of spaced holes formed in part by the bearing seats of a half round connection yoke;

FIG. 2 is an elevational view partially in section showing the gaging tool of this invention checking the alignment of holes in the half round yoke structure of FIG. 1 wherein the holes are found in alignment;

FIG. 3 is an elevational view of a connection yoke with the alignment tool of this invention detecting misalignment, shown on an exaggerated scale, typically caused by an improper disassembly procedure or a previous failure resulting in heat distortion;

FIG. 4 is an end view of a connection yoke with the tool of this invention detecting misalignment, shown on an exaggerated scale, typically caused by excessive torque or a previous heat distortion failure.

DETAILED DESCRIPTION OF PRESENTLY PREFERRED EMBODIMENT OF THE INVENTION

Figure 5:
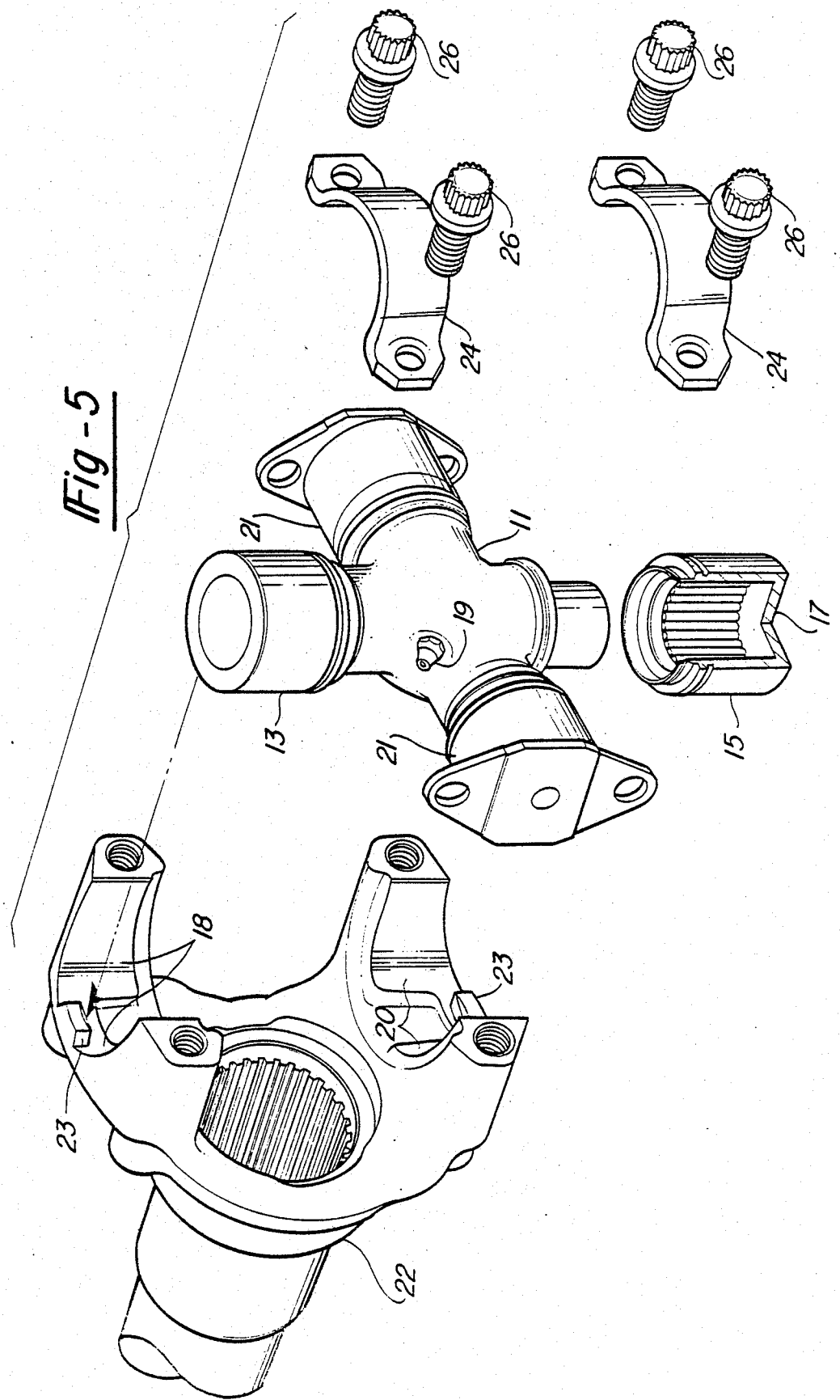
FIG. 5 is an exploded perspective view of a universal joint kit showing its attachment to a half round end yoke to illustrate the environment in which the tool of this invention is used.

Referring to the drawing, gaging tool 10 for checking the alignment of two spaced apart holes located on a common axis and defined by half round bearing seats is shown as including cylindrical alignment bar 12 and a pair of gage bushings 14 and 16. The outside diameter of gage bushings 14 and 16 corresponds to the diameter of the holes whose alignment is to be checked. These holes to be checked are the semi-circular or half round bearing seats 18 and 20 on a half round yoke 22.

In renewing worn universal joints, for example, at the ends of an automotive drive shaft, the four bearings and U-joint cross are completely replaced. To assure that the new installation reaches its potential life, it is extremely important that the cross holes are in alignment. This alignment cannot be ascertained by the naked eye, and sometimes complex procedures are used to check alignment. The aforementioned Dana alignment bar solved this alignment checking problem for full round types of yokes, but it does not offer a solution for the illustrated bearing seats on a half round yoke.

As shown in FIG. 5, a new universal joint kit 11 is to be installed in the bearing seats 18 and 20 of half round yoke 22. This is accomplished by backing out bolts 26 and removing or swinging retention straps 24 clear to remove the old kit and install the new kit 11. Bearings 13 and 15 of U-joint kit 11 fit into half round bearings seats 18 and 20 respectively. The bearings are pushed into and held in precise alignment in the seats 18 and 20 by straps 24 as the bolts 26 are retightened. Bearings 13 and 15 are constructed with a closed end cap shown at 17 to prevent contamination by foreign matter and are kept lubricated through grease fitting 19. End lugs 23 on yoke 22 prevent axial movement of the closed end caps or cups 17. There is no way to check the alignment of bearing seats 18 and 20 prior to installation of the new U-joint kit 11 by only using alignment bar 12 or by using it in combination with new or used bearing caps 17. Aligned needle bearings 21 on the other portion of the U-joints are shown as the type for installation in a full round yoke (not shown).

As shown in FIG. 1, gage bushings 14 and 16 are placed in bearing seats 18 and 20 and are secured to yoke 22 by retaining strap 24 with bolts 26. Gage bushings 14 and 16 have uniform internal gage bores 28 and 30 respectively.

Alignment bear 12 has a cylindrical configuration with a gaging portion 32 and an abutting knurled handle portion 34 of the slightly smaller diameter than the gaging portion. Gaging portion 32 is accurately ground to be closely received through the internal gage bores 28 and 30 of gage bushings 14 and 16.

In use, after the gage bushings have been secured in the holes, their alignment and hence the bearing seat alignment can be checked by inserting the gaging portion 32 of alignment bar 12 through the internal bore 28 in a first gage bushing 14, and if it enters and passes through the internal gage bore 30 of the second gage bushing 16 by an axial or a combined axial and rotating movement of the alignment bar 12, the two holes are in alignment as shown in FIG. 2.

FIG. 3 shows on an exaggerated scale an end yoke in which the holes are clearly out of alignment due to the fact that one of its lugs 36 has become distorted. This is normally caused by the improper disassembly of the joint or by a heat distortion failure in use. Likewise, FIG. 4 shows on an exaggerated scale an axial misalignment of the two holes. This type of condition has been usually caused by the application of excessive torque (overload) or by heat distortion.

Alignment tool 10 would normally be supplied with more than one pair of gage bushings so that the alignment of various size bearing seats can be checked. In this case, each pair of gage bushings would have an appropriately different external diameter to match the size of the bearing seats in the particular yoke 22 being checked. Normally, the internal bores 28 and 30 of all of the gage bushing pairs would be identical to accomodate a single uniform gaging portion 32 on the alignment bar 12. In some circumstances these gage bores can be different, and the gaging portion of the alignment bar can be appropriately stepped to accomodate this difference in diameter. It is only necessary that the gaging portion of the alignment bar intended to be received in the internal bore of the individual gage bushings have a matching, close fitting, uniform diameter. The gaging portion 32, or at least a portion thereof, is preferably circular in cross-section at the gage bushing engaging locations to avoid any necessity for, in effect, requiring alignment of the gage bushings before hole alignment checking can take place.

The embodiments of the invention in which an exclusive property or privilege is claimed are defined as follows:

1. A gaging tool for determining if the half round bearing seats establishing the cross holes of a universal joint yoke are in alignment comprising, in combination:
   a pair of gage bushings each having an outside diameter corresponding to the diameter of the cross holes whose alignment is to be checked and a uniform internal gage bore;
   means for removably securing one gage bushing in one cross hole,
   means for removably securing the other gage bushing in the other cross hole; and
   a cylindrical alignment bar having a gaging portion spanning the distance between said cross holes, said gaging portion having an external diameter adapted to be closely received through the internal gage bore in each of said pair of gage bushings, said alignment bar being axially slidably and removably received through said gage bores of each of said pair of gage bushing only when said gage bores are in alignment and otherwise being axially slidable through only one gage bushing to thereby provide an indication of the alignment or lack of alignment of said cross holes.

2. The gaging tool according to claim 1 wherein each of said pair of gage bushings have the same outside diameter for checking the alignment of two spaced apart cross holes of the same diameter.

3. The gaging tool according to claim 1 wherein each of said pair of gage bushings has the same internal gage bore diameter and at least the portions of said alignment bar which are to be received in each of said internal gage bores have the same external diameter.

4. The gaging tool according to claim 3 wherein said gaging portion has a uniform diameter spanning the distance between the cross holes whose alignment is to be checked.

5. The gaging tool according to claim 4 wherein said alignment bar has a handle portion abutting said gaging portion.

6. The gaging tool of claim 1 wherein said pair of gage bushings constitute a first pair of gage bushings for checking the alignment of a first pair of cross holes on a common axis, and further comprising:
a second pair of gage bushings each having an outside diameter different from the outside diameter of said first pair of gage bushings and having the same uniform internal gage diameter of said first pair of gage bearings to check the alignment of a second pair of cross holes on a common axis.

* * * * *